J. C. WILLIAMSON.
ROPE TAKE-UP.
APPLICATION FILED JULY 3, 1913.
1,092,618.
Patented Apr. 7, 1914.
2 SHEETS—SHEET 1.
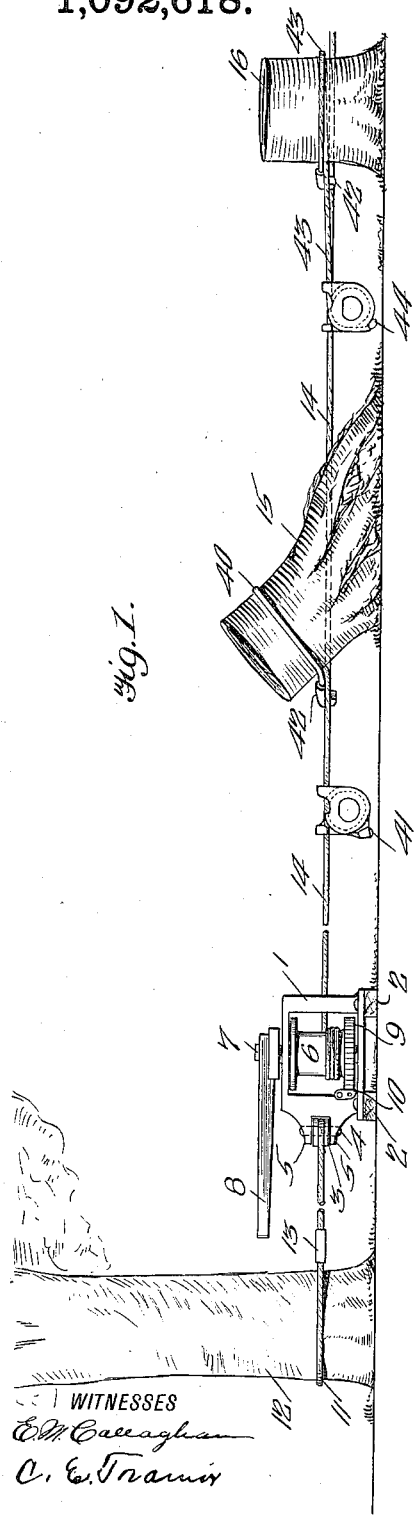
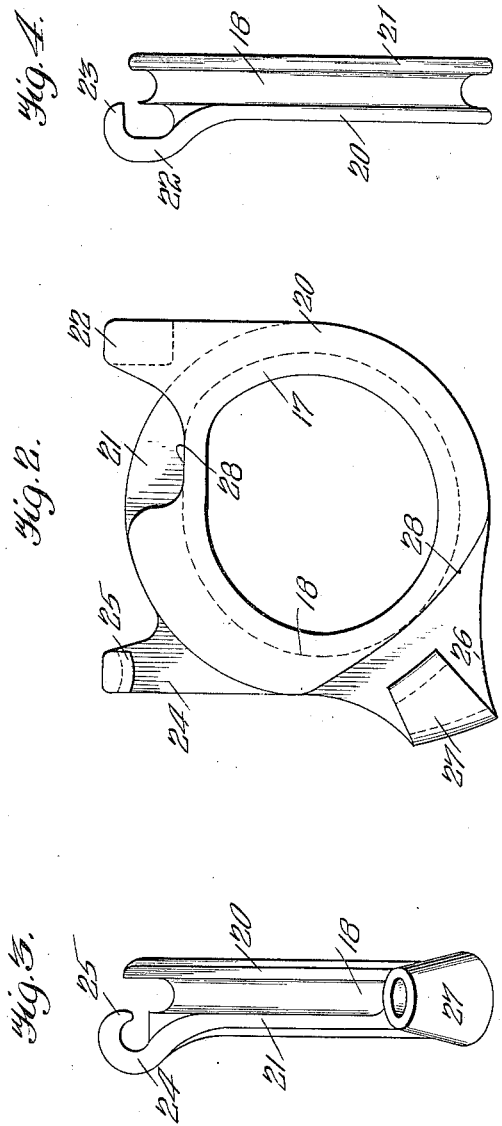
WITNESSES
INVENTOR
JAMES CLARENCE WILLIAMSON,
BY Munn & Co.
ATTORNEYS

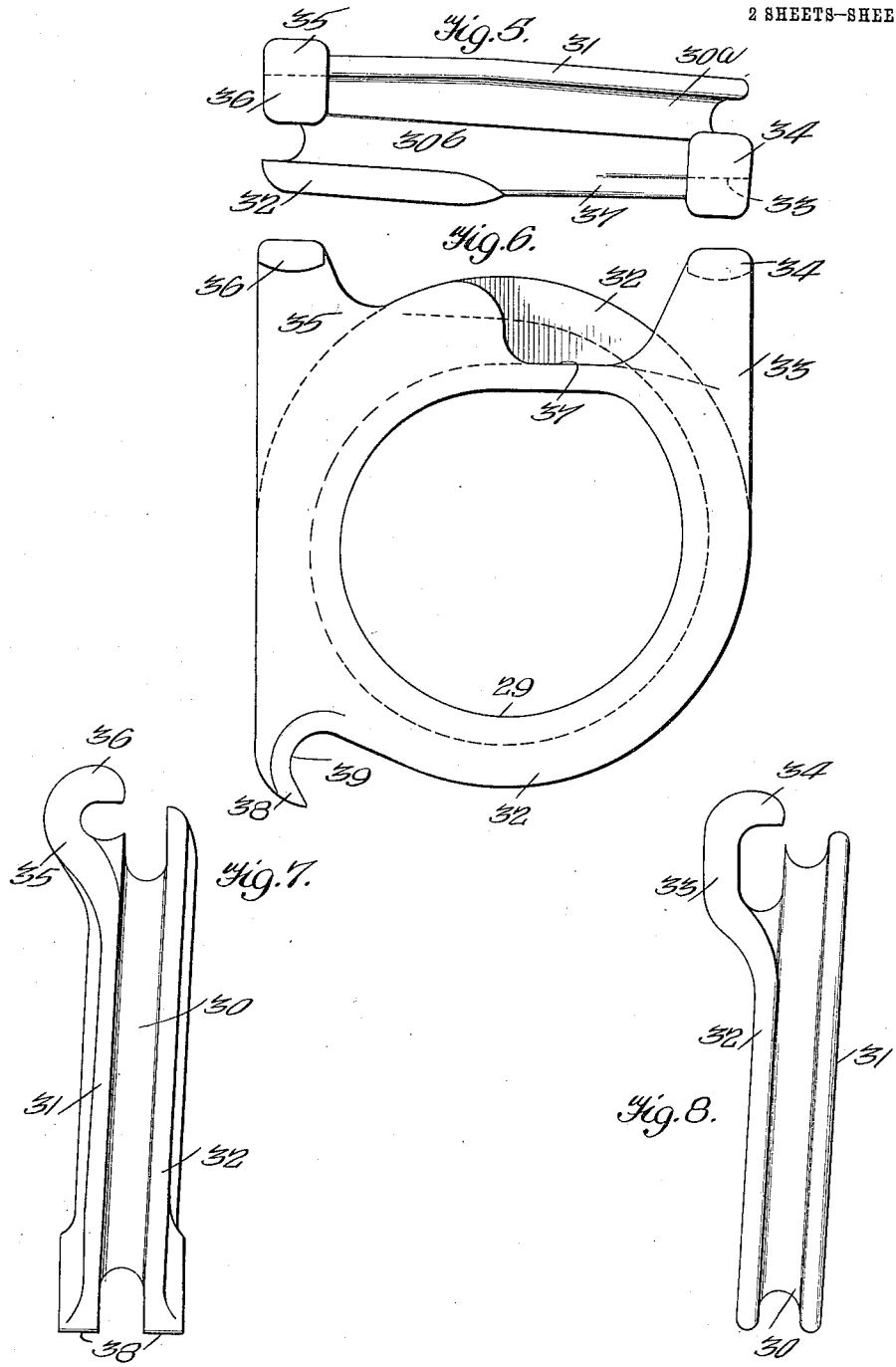

UNITED STATES PATENT OFFICE.

JAMES CLARENCE WILLIAMSON, OF CORDELE, GEORGIA.

ROPE TAKE-UP.

1,092,618.  Specification of Letters Patent.  Patented Apr. 7, 1914.

Application filed July 3, 1913. Serial No. 777,220.

*To all whom it may concern:*

Be it known that I, JAMES CLARENCE WILLIAMSON, a citizen of the United States, and a resident of Cordele, in the county of Crisp and State of Georgia, have invented a new and useful Improvement in Rope Take-Ups, of which the following is a specification.

My invention is an improvement in rope take-ups, and has for its object to provide a device of the character specified, for use in stump pullers and like machines, wherein a take-up or tie is provided for connecting the stump to the pull rope, so arranged that after a stump has been pulled, the take-up or tie may be released from the pull rope, and removed to another stump for connection with the said other stump and without interfering with the operation of the pull rope as it pulls the succeeding stump.

In the drawings:—Figure 1 is a side view of a stump puller in operation, utilizing the improved take-up, Fig. 2 is a side view of the take-up, Fig. 3 is an end view of Fig. 2, looking at the end adjacent to Fig. 3, Fig. 4 is an end view of Fig. 2, looking at the end adjacent to Fig. 4, Fig. 5 is a top plan view of a modified form, Fig. 6 is a side view of the same, and Figs. 7 and 8 are end views looking at opposite ends.

The present embodiment of the invention is shown in connection with a stump puller comprising a supporting frame 1 having a base 2, and provided at one end with a pulley 3, journaled on a vertical shaft 4, supported in bearing lugs 5, which extend from one end of the frame. A capstan or reel 6 is provided with a shaft 7, which is journaled in the frame and the base in vertical position, and the shaft is provided with a sweep 8 at its upper end for rotating the reel or capstan.

A ratchet wheel 9 is secured to the lower end of the reel, and a pawl 10 coöperates with the ratchet wheel to prevent reverse movement of the capstan. A rope 11 is passed over the pulley 3, and over a fixed support, as for instance a tree 12, and the ends of the rope are connected as shown at 13, the tree acting as an anchor for the capstan. A rope 14 winds at one end on the capstan, and the said rope is adapted to be connected with the stumps 15, and 16, to be pulled by means of the take-ups to be described and stump engaging ropes.

The stump puller is anchored to a tree or other fixed support 12, and the rope is first engaged with the nearest stump, as shown. The rope is connected to the stump by means of the improved take-up or tie and while the capstan is being operated to pull the stump 15, the rope is extended and engaged with the next nearest stump 16, the improved take-up being again used to secure the rope in place around the stump 16. The rope is thus engaged with the stumps in succession until all of the stumps within reach in the direction in which the rope 14 is extended have been pulled. After all of the stumps in reach in the particular direction in question have been pulled, the rope 14 is freed from its attachments, the capstan is thrown out of gear, the rope 14 unwound from the drum and extended in another direction, after which the process is repeated.

In the usual method of pulling stumps, a stump is connected to the pulling rope and pulled. The rope is then released and engaged with another stump and the process is repeated. With the present construction however, as soon as the heavy pull is over with the first stump, that is, as soon as the said stump has been loosened, the rope is engaged with the succeeding stump, so that by the time the first stump has been pulled, the second stump is ready for pulling. It will be evident that operating in this manner, a much larger number of stumps may be pulled within any predetermined space of time, without over-working the crew or the team. In addition it is not necessary to stop the team attached to the sweep after the stump is loosened, the team with the present take-up or tie working continuously, since whenever a stump is loosened another is ready to be pulled.

The improved tie or take-up shown in Figs. 2 to 4, comprises a ring-shaped or annular frame 17, having an external spiral groove 18, and at the upper side of the frame the opposite side walls 20 and 21 of the groove are extended tangentially and laterally to form engaging lugs. The lug 22 connected with the groove wall 20 is offset laterally from the groove, as shown in Fig. 4, and the free end of the lug is bent at an angle to the lug toward the frame as shown at 23, the free edge of the said angular portion 23 being flush with the inner face of the said wall 20 of the groove. The lug 24 of the side wall 21 extends laterally away from the plane of the frame, and the free end is bent over to form a hook 25, and the opening through the hook is at one side of the groove as shown. The side wall 21 of the groove is extended radially as shown at 26 at a point diametrically opposite the lug 22, and the outer end of the said extension 26 is provided with a frusto-conical bearing 27. The large end or base of the bearing 27 is at the opposite end of the bearing from the lug 24, and the side wall 20 of the groove is cut away adjacent to the bearing, as shown at 28, the line of the cut striking the bottom of the groove at approximately the large end of the bearing 27. The said side wall 20 is also provided with a cut-away portion 28, between the lugs 22 and 24 and adjacent to the lug 22. It will be noted from an inspection of Figs. 3 and 4 that the openings of the lugs 22 and 24 are offset radially above the bottom of the groove 18, while the opening through the lugs 22—23 is offset inwardly below the level of the bottom of the said groove. The above-described take-up or tie is permanently connected with the stump rope, while the construction shown in Figs. 5 to 8 is detachable therefrom. The said construction comprises a frame 20 of ring shape or annular form and provided on its periphery with a spiral groove 30. Each of the side walls 31 and 32 of the groove is provided at the upper side of the frame with laterally offset tangential extensions or lugs, the extension 33 from the side wall 32 having its free end bent laterally toward the plane of the frame, as indicated at 34. The extension or lug 35 for the side wall 31 of the frame also has its free end bent laterally toward the frame as shown at 36, and the free ends of the said lateral portions 34 and 36 are flush with the inner face of the adjacent side wall of the groove.

It will be noted from an inspection of Figs. 7 and 8 that the opening through each lug or hook 33 and 35 is offset laterally from the groove 30 and that the said opening through the hook or lug 33 and 34 is offset inwardly from the bottom of the groove while the opening of the hook or hooks 35—36 is offset laterally from the bottom of the groove. At the top of the frame, the ends of the spiral groove 30 extend alongside each other, and the said ends are designated 30ª and 30ᵇ respectively.

It will be noticed from an inspection of Fig. 5 that the portions 36 of the lug or hook 35—36 overlies the end 30ª of the groove, while the portion 34 of the hook or lug 33—34 overlies the end 30ᵇ of the groove. The side wall 32 of the groove is also cut away between the lugs, and adjacent to the lug 33—34, as indicated at 37, the said cut-away portion extending to the bottom of the end 30ᵇ of the groove.

At a point diametrically opposite the lug or hook 33—34, each of the side walls 31 and 32 of the groove is provided with a radial hook 38, the said hooks being in register, and each hook has its concave face 39 in the opposite direction from the lugs or hooks 35—36. The said hooks 38 are separated by the groove 30.

In use, after the stump puller has been set and anchored, the rope 14 is engaged with the nearest stump 15, and the take-up shown in Figs. 3 and 4 is connected with the rope between the stump and the stump puller. The rope 14 is passed around the frame in the groove 18, the said rope passing first from the capstan or reel beneath the hook 24—25, then around the frame in the groove 18, and on beyond the stump 15. The stump engaging rope 40 is passed at one end through the bearing 27 and is provided with a stop 41 at the large end of the bearing. The rope 40 is passed upward and over the frame, lying alongside or upon the coils of the rope 14, and the said rope is then passed around the stump as shown and the hook 42 on the opposite end thereof from the stop 41 is engaged with the rope 40. After the stump 15 has been loosened so that the heaviest part of the pull is passed, that portion of the rope 14 beyond the stump 15 is passed over the construction shown in Figs. 5 to 8. The rope 14 first passes beneath the hook 35—36 and encircles the frame lying in the groove 30 and finally leaves the frame, passing through the hook 33—34. A second stump engaging rope 43 is provided at one end with a stop 44, and the said stop is engaged with the hook 38, the body of the rope passing up and over the frame alongside or upon the coils of the rope 14, and the rope 43 is then passed around the stump 16 as shown, and the hook 42 at the free end thereof is engaged with the rope 43. When the stump 15 has been pulled, the rope 40 is released, and the take-up shown in Figs. 2 to 4 may be engaged with another stump in the same manner. When the stump 16 is loosened, the rope 43 is removed, and the said rope and the take-up or tie are utilized to connect with a fourth stump. In this manner the operation of pulling is continuous, the succeeding stump being connected with the rope while the preceding stump is being pulled.

The only difference between the two constructions, namely that shown in Figs. 2 to 4 and that shown in Figs. 5 to 8, is in the means for connecting the stump rope to the said take-up or tie. In the construction of Figs. 2 to 4 the stump rope is permanently connected with the take-up or tie, while in the construction of Figs. 5 to 8 the stump rope is detachably connected with the said take-up or tie. The construction shown in Figs. 5 to 8 offers the advantage, that while any particular stump has been pulled, the stump rope connected to the said stump may be released from the take-up and the stump, and attched to a stump nearer the capstan than the stump just pulled, and after the take-up from which the stump rope has been detached has moved up to said stump to which the removed stump rope has been attached, the said rope may be connected with the take-up. It will be understood that the friction between the pulling rope and the take-up prevents the pulling rope slipping on the take-up, and since the stump engaging ropes pass over the coil of the pulling rope on the take-up, the pressure exerted by the said stump engaging ropes also assists in preventing slipping.

I claim:—

1. A device for connecting a stump engaging rope to a pull rope and comprising a frame having an approximately cylindrical periphery provided with a spiral groove whose ends lie alongside each other at the top of the frame, said frame having a hook overlying each end of the groove and at the outer side of the said groove for engaging the pull rope as it engages and leaves the frame, said frame having means for engagement by one end of the stump rope and arranged at the opposite side of the frame from the other end of the stump rope to constrain the stump rope to overlie the ends of the groove as it passes over the frame from its connection.

2. A device for connecting a stump engaging rope to a pull rope and comprising a frame having an approximately cylindrical periphery provided with a spiral groove whose ends lie alongside each other at the top of the frame, the frame having means for limiting the upward movemnt of the pull rope at each end of the groove and on the outer side thereof, and having means for engagement by one end of the stump engaging rope, said means being on the opposite side of the frame from the opposite end of the stump engaging rope and below the adjacent limiting means to constrain the stump rope to overlie the ends of the groove as it passes from the engaging means of the frame to the stump.

JAMES CLARENCE WILLIAMSON.

Witnesses:
J. W. GUNSON,
E. A. VINSON.

---

Copies of this patent may be obtained for five cents each, by addressing the "Commissioner of Patents, Washington, D. C."